(No Model.)
J. McDONALD.
PINCH BAR.
No. 498,677.	Patented May 30, 1893.
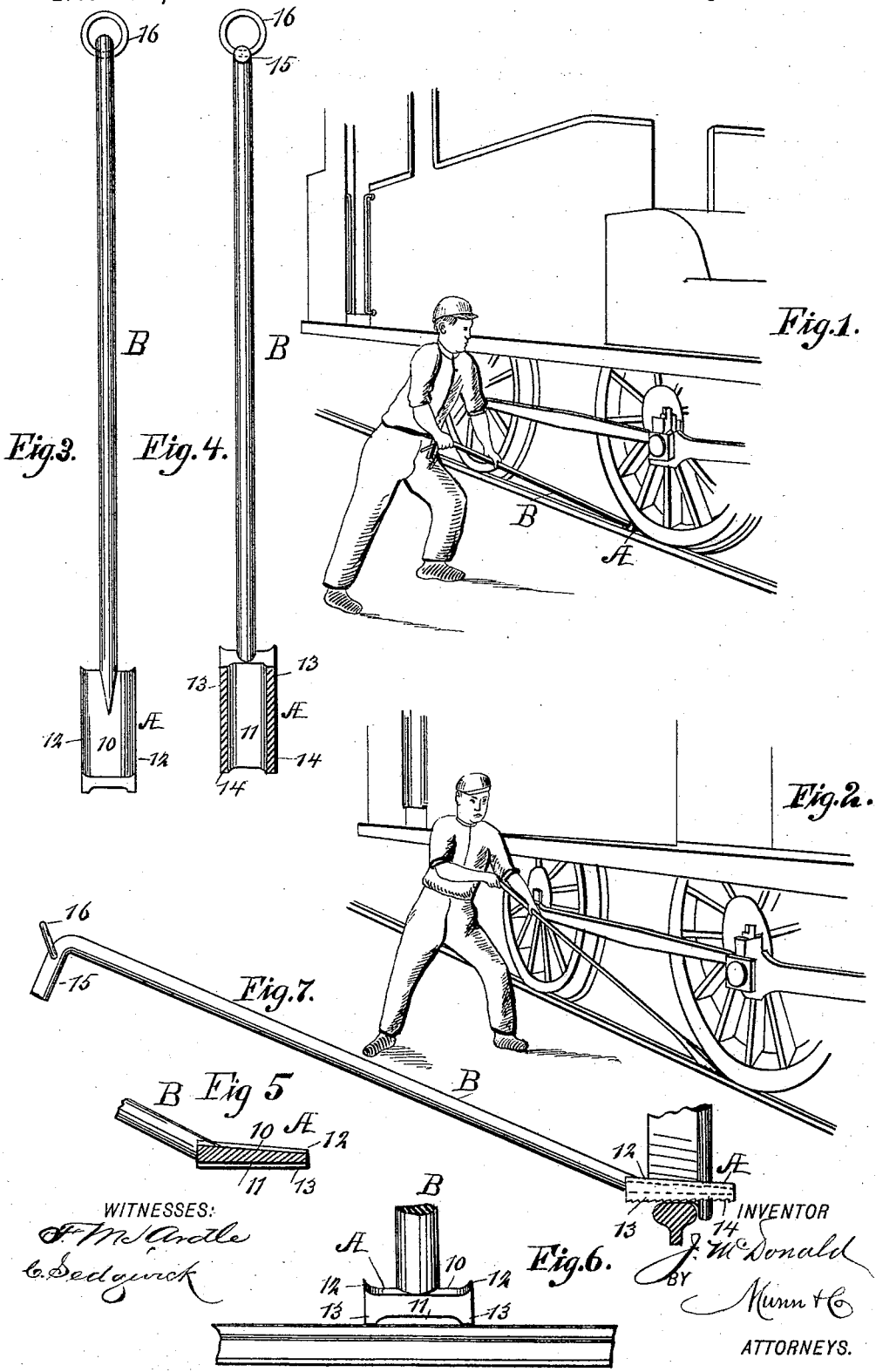
WITNESSES:
F. McArdle
C. Sedgwick
INVENTOR
J. McDonald
BY Munn & Co
ATTORNEYS.

UNITED STATES PATENT OFFICE.

JOHN McDONALD, OF TOKIO, JAPAN.

PINCH-BAR.

SPECIFICATION forming part of Letters Patent No. 498,677, dated May 30, 1893.

Application filed December 30, 1892. Serial No. 456,800. (No model.)

*To all whom it may concern:*

Be it known that I, JOHN MCDONALD, of Tokio, Japan, have invented a new and Improved Pinch-Bar, of which the following is a full, clear, and exact description.

My invention relates to an improvement in pinch bars, and it has for its object to provide a bar especially adapted for moving locomotives and railway cars when there is no other power convenient, or for turning a wheel of such vehicles.

A further object of the invention is to construct a bar in such manner that it may be operated when it is at right angles to the track and wheel, and whereby the bar will be made to pinch upon the flange and not upon the tread of the wheel.

Another object of the invention is to construct the bar in a durable and economic manner, render it exceedingly convenient to manipulate, and when manipulated whereby more power will be obtained than can be had from an ordinary bar, and also to provide for the protection of the operator's hands in the event the bar should slip.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a view representing the application of the improved bar. Fig. 2 is a view representing the manner in which the ordinary bar is used. Fig. 3 is a plan view of the bar. Fig. 4 is an inverted plan view. Fig. 5 is a longitudinal vertical section through the foot of the bar. Fig. 6 is a rear view of the foot of the bar, showing it in position upon a rail; and Fig. 7 is a side elevation of the bar showing it applied to a rail and a wheel.

The pinch bar, as has been heretofore stated, is to be used at an angle, preferably at a right angle, to the track and wheel to be operated upon, and not parallel with the track and facing the tread of the wheel, as the ordinary bar is applied, and the improved bar is to be applied to the flange of the wheel and not to the tread. By so using the bar it can be more conveniently and expeditiously manipulated than the ordinary form of pinch bar, and much more power is obtained, as the amount of leverage far exceeds that obtainable with the old form of bar.

The bar comprises a foot A and a handle B, preferably made integral. The foot is ordinarily made of practically rectangular shape in cross section, and the upper surface is somewhat inclined, the bottom being straight. Both the upper and lower surfaces are dished, producing longitudinal cavities 10 and 11, the upper cavity being the widest, as it extends essentially to the sides, forming raised knife-like side edges 12, as shown in Fig. 6, while the lower cavity terminates a sufficient distance from the under side edges of the foot to produce flat longitudinal side ribs 13, which may be smooth or roughened, or have serrations or teeth 14, produced in them, as illustrated. The upper knife-edges 12, are to engage with the flange of the wheel to be operated upon, and the ribs are to rest upon the tread of the rail transversely thereof.

The handle is placed at a convenient angle to the foot, as shown best in Fig. 7, and a head 15, is formed at the upper end of the handle by carrying the metal of the handle downward beneath it. The head prevents injury to the hands of the operator in the event the bar should slip, as the head will strike the ground and leave ample hand room between it and the handle. The head of the bar is also usually provided with a ring 16, or its equivalent, enabling the bar to be hung up.

In operation the foot of the bar is placed transversely upon the tread of the rail, one sharp side edge is brought in engagement with the flange of the wheel, and by giving slight side movement to and downward pressure upon the bar the wheel will be turned surely and readily.

If the rectangular edges are sharp as in the construction of a skate runner, the dishing on the upper surface if not the lower surface, may be unnecessary, but preferably, the bar is constructed as herein set forth.

Having thus described my invention, I claim as new and desire to secure by Letters Patent—

1. A pinch bar provided with a foot having knife-like longitudinal edges on its upper surfaces, substantially as described.

2. A pinch bar comprising a foot and handle, the foot being provided with sharp upper side edges and longitudinal ribs upon its under face at the sides, substantially as and for the purpose specified.

3. A pinch bar the foot of which is provided with pronounced knife-like upper side edges and ribs upon the under surface at its sides, substantially as shown and described.

4. A pinch bar the foot of which is provided with pronounced knife-like upper side edges, and side ribs upon its under surface parallel with the knife edges, substantially as and for the purpose specified.

5. A pinch bar the foot of which is provided with an inclined upper surface and knife-like side edges raised above the adjacent surfaces, the bottom of the foot being straight and provided with side ribs, as and for the purpose specified.

JOHN McDONALD.

Witnesses:
WILLIS NORTON WHITNEY,
EDWIN DUN,
    *Both of Tokio, Japan.*